United States Patent

Wenz et al.

Patent Number: 5,312,864
Date of Patent: May 17, 1994

[54] α-CYANOACRYLATE ADHESIVE COMPOSITIONS

[75] Inventors: Gerhard Wenz, Mainz; Konrad Engelskirchen, Meerbusch; Herbert Fischer, Duesseldorf; Heinz C. Nicolaisen, Hannover, all of Fed. Rep. of Germany; Steven Harris, Dublin, England

[73] Assignees: Henkel Kommanditgesellschaft auf Aktien, Duesseldorf; Max-Planck-Gesellschaft zur Foerderung der Wissenschaften eV, Goettingen, both of Fed. Rep. of Germany

[21] Appl. No.: 927,482

[22] PCT Filed: Mar. 18, 1991

[86] PCT No.: PCT/EP91/00517

§ 371 Date: Nov. 17, 1992

§ 102(e) Date: Nov. 17, 1992

[87] PCT Pub. No.: WO91/14749

PCT Pub. Date: Oct. 3, 1991

[30] Foreign Application Priority Data

Mar. 26, 1990 [DE] Fed. Rep. of Germany ....... 4009621

[51] Int. Cl.$^5$ ................................................ C09J 4/04

[52] U.S. Cl. .................................... 524/716; 524/730; 524/734; 524/850

[58] Field of Search ................. 524/48, 716, 730, 734, 524/850

[56] References Cited

U.S. PATENT DOCUMENTS

| | | | |
|---|---|---|---|
| 3,453,260 | 7/1969 | Parmerter et al. | 524/48 |
| 4,636,539 | 1/1987 | Harris et al. | 524/850 |
| 4,722,815 | 2/1988 | Shibanai | 524/48 |
| 5,177,129 | 1/1993 | Bobo, Jr. | 524/48 |

FOREIGN PATENT DOCUMENTS 0142327  5/1985  European Pat. Off. .
2816836 10/1978  Fed. Rep. of Germany .

OTHER PUBLICATIONS

D. French et al., J. Am. Chem. Soc. 71, 1949, pp. 353–356.

Primary Examiner—Joseph L. Shofer
Assistant Examiner—R. H. Delmendo
Attorney, Agent, or Firm—Ernest G. Szoke; Wayne C. Jaeschke; Real J. Grandmaison

[57] ABSTRACT

The setting properties of an α-cyanoacrylate adhesive composition are accelerated by adding thereto a hydroxyl group derivative of an α-, β- or γ-cyclodextrin which is at least partly soluble in the α-cyanoacrylate.

7 Claims, No Drawings

α-CYANOACRYLATE ADHESIVE COMPOSITIONS

BACKGROUND OF THE INVENTION

1. Field of the Invention

This invention relates generally to adhesives and, more particularly, to quick-setting adhesive compositions based on α-cyanoacrylates which contain α-, β- and/or γ-cyclodextrin derivatives at least partly soluble in the cyanoacrylates.

Adhesive compositions based on α-cyanoacrylates are capable of curing in a very short time and are eminently suitable for bonding a number of materials. Cyanoacrylate adhesives are generally cured by anionic polymerization initiated by only small traces of even weak bases, such as water or methanol. Problems arise in the use of these adhesives for bonding porous materials and for bonding substrates having surfaces showing an acidic reaction which inhibit the anionic polymerization of the α-cyanoacrylate. For example, setting times of up to 20 minutes are required in the bonding of cellulose-containing materials, quite apart from the fact that the bond strength of the joined materials is often unsatisfactory.

Now, various attempts have been made to shorten the setting times, even in the case of problematical materials.

2. Discussion of Related Art

DE-OS 28 16 836 describes α-cyanoacrylate adhesives with shortened setting times which contain at least one macrocyclic polyether compound (crown ether) selected from the group of macrocyclic polyethers and their analogs as setting accelerator. According to European patent application 142 347, crown compounds containing silicon atoms are added to the cyanoacrylates as accelerators in quantities of 0.1 to 5%. However, these adhesive compositions have certain negative properties. For example, their stability in storage is in need of improvement.

Accordingly, the problem addressed by the present invention was to find other additives which would significantly shorten the setting times of cyanoacrylates without adversely affecting their stability in storage

DESCRIPTION OF THE INVENTION

Other than in the operating examples, or where otherwise indicated, all numbers expressing quantities of ingredients or reaction conditions used herein are to be understood as modified in all instances by the term "about".

It has now surprisingly been found that the addition of α-, β- and/or γ-cyclodextrin derivatives which are at least partly soluble in α-cyanoacrylates considerably shortens the setting times of adhesive compositions based on α-cyanoacrylates without adversely affecting their stability in storage.

Accordingly, the present invention relates to adhesive compositions based on α-cyanoacrylates and setting accelerators, characterized in that the adhesive composition contains hydroxyl group derivatives of α-, β- and/or γ-cyclodextrins at least partly soluble in α-cyanoacrylates.

In the context of the invention, "hydroxyl group derivatives" are exclusively derivatives in which one or more of the free hydroxyl groups present in cyclodextrins have been reacted.

The present invention also relates to new cyclodextrin derivatives.

The adhesives according to the invention contain as their principal component α-cyanoacrylate monomers which are esterification products of α-cyanoacrylic acid with an alcohol ROH, where R is a linear or branched $C_{1-2}$ alkyl group which may be substituted by a halogen atom or by an alkoxy group, a linear or branched $C_{2-12}$ alkenyl group, a linear or branched $C_{2-12}$ alkynyl group, a cycloalkyl group, an aralkyl group or an aryl group. According to the invention, preferred cyanoacrylates are those in which R is a methyl group, ethyl group, n-propyl group, isopropyl group, n-butyl group, isobutyl group, pentyl group, hexyl group, allyl group, methallyl group, crotyl group, propargyl group, cyclohexyl group, benzyl group, phenyl group, cresyl group, 2-chloroethyl group, 3-chloropropyl group, 2-chlorobutyl group, trifluoroethyl group, 2-methoxyethyl group, 3-methoxybutyl group and 2-ethoxyethyl group.

The α-cyanoacrylates used in accordance with the present invention may be a single α-cyanoacrylate monomer or a mixture of two or more α-cyanoacrylate monomers.

The adhesive compositions according to the invention contain the α-cyanoacrylate monomers as their principal component, preferably in quantities of 70 to 99.9% by weight and, more preferably, in quantities of 80 to 99.5% by weight, based on the total weight of the adhesive composition.

According to the invention, the adhesive composition contains hydroxyl groups derivatives of α-, β- and/or γ-cyclodextrins which are at least partly soluble in α-cyanoacrylates as a further component.

The adhesive compositions according to the invention contain the hydroxyl group derivatives of α-, β- and/or γ-cyclodextrins at least partly soluble in α-cyanoacrylates in quantities of 0.001% by weight to 5% by weight and preferably in quantities of up to 3% by weight, based on the adhesive composition. In the context of the invention, hydroxyl group derivatives of α-, β- and/or γ-cyclodextrins at least partly soluble in α-cyanoacrylates are those which are present in the form of genuine solutions in α-cyanoacrylates at least in quantities of more than 0.001% by weight. In a preferred embodiment, the adhesive compositions according to the invention contain the derivatives of α-, β- and/or γ-cyclodextrins in the form of true solutions in α-cyanoacrylates in quantities of 0.005% by weight to 1% by weight, preferably in quantities of 0.01 to 0.5% by weight and, more preferably, in quantities of 0.03 to 0.3% by weight, based on the adhesive composition.

Hydroxyl group derivatives of α-, β- and/or γ-cyclodextrins at least partly soluble in α-cyanoacrylates also include those which are only dissolved in α-cyanoacrylates—at least in quantities of 0.001% by weight—at elevated temperatures, but below the decomposition or boiling temperature of the components, and/or using a solubilizer. Solubilizers known to the expert, for example phthalates, cyanoacetates and the like, may be used as the solubilizers in quantities of up to 20% by weight, based on the adhesive composition.

Cyclodextrins are cyclic, non-reducing oligosaccharides which are obtained by the enzymatic degradation of starch. They consist of D-glucose units (anhydroglucose) which are attached by an α-1,4-glycosidic bond. Depending on the number of glucose molecules, cyclodextrins are divided into α-, β- and γ-cyclodextrins. α-Cyclodextrin consists of 6 glucose molecules bearing a total of 18 hydroxyl groups. β-Cyclodextrin consists of 7 glucose molecules bearing a total of 21 hydroxyl groups while γ-cyclodextrin consists of 8 glucose molecules bearing a total of 24 hydroxyl groups. In the context of the invention, hydroxyl group derivatives of α-, β- and/or γ-cyclodextrins are exclusively reaction products in which a chemical reaction has taken place at at least one hydroxyl group. Depending on the reaction conditions selected, the hydroxyl groups may be completely or partly derivatized, the cyclic structure of the cyclodextrins remaining intact.

According to the invention, α-, β- and/or γ-cyclodextrin derivatives at least partly soluble in α-cyanoacrylate are used, the hydroxyl groups having been reacted on a statistical average in derivatization degrees of 25 to 100%, preferably above 30%, more preferably above 50% and, most preferably, above 60%.

The expression "on a statistical average" used herein means that product mixtures of cyclodextrins with different degrees of derivatization, which may also contain cyclodextrin derivatives having lower or higher degrees of derivatization than the statistical average, are obtained after the (partial) derivatization of the cyclodextrins.

According to the invention, however, it is of advantage to have only small percentages of cyclodextrin derivatives with a degree of derivatization below 25% because otherwise adequate solubility in α-cyanoacrylates is no longer guaranteed. The degree of derivatization is understood to be the quotient of derivatized hydroxyl groups to free hydroxyl groups which is expressed in percent.

One embodiment of the present invention is characterized by the use of derivatives of α-, β- and/or γ-cyclodextrins of which the hydroxyl groups have been derivatized by etherification, esterification, silylation and/or urethanization.

In addition to carbonates of the cyclodextrins, suitable derivatives of α-, β- and/or γ-cyclodextrins are preferably those corresponding to general formula I

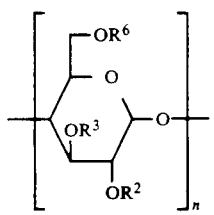

(I)

in which $R^2$, $R^3$ and $R^6$ may be the same or different and represent hydrogen—except for compounds where $R^2$, $R^3$ and $R^6$ are hydrogen atoms—and/or an alkyl group and/or alkylene group and/or a cycloalkyl group and/or an alkylaryl group and/or an acyl group and/or a trialkylsilyl group and/or a urethane group and n is the number 6, 7 or 8.

The groups mentioned may also bear other substituents, such as halogens, ether, ester or alkoxy groups. In addition, the individual glucose units of the particular cyclodextrins may differ in their substitution pattern within the scope of the invention.

The adhesive compositions according to the invention preferably contain derivatives of α-, β- and/or γ-cyclodextrins corresponding to general formula I, in which $R^2$, $R^3$ and $R^6$ are hydrogen atoms—except for compounds in which $R^2$, $R^3$ and $R^6$ are hydrogen atoms and/or a linear or branched alkyl group or alkenyl group containing up to 12 carbon atoms and/or an alkylaryl group containing up to 12 carbon atoms and/or an acyl group —C(O)—R' and/or a urethane group and/or a trialkyl silyl group —SiR''$_3$, where R' is a hydrogen atom, a linear or branched alkyl or alkenyl group or a cycloalkyl group or an alkylaryl group containing up to 12 carbon atoms or an aryl, which may optionally bear substituents, such as halogens, ether, ester or alkoxy groups, and R'' is an alkyl group containing up to 6 carbon atoms.

The present invention also relates to new derivatives of α-, β- and/or γ-cyclodextrins containing carbamoyl groups, carbonate groups and/or trimethylsilyl groups in any combination, for example α-, β- and/or γ-cyclodextrin derivatives containing alkyl and carbamoyl groups
acyl and carbamoyl groups
arylalkyl and carbamoyl groups
trialkylsilyl and carbamoyl groups
carbonate and carbamoyl groups and
carbamoyl groups as single substituents at the OH groups. Emphasis is placed on the phenyl carbamoyl derivatives of β-cyclodextrin and also on trimethylsilyl-O-β-cyclodextrin. The present invention quite generally provides new derivatives of α-, β- and/or γ-cyclodextrins in which at least one of the substituents $R^2$, $R^3$ or $R^6$ in formula (I) is a carbamoyl group or a trimethylsilyl group and the other substituents represent an unsubstituted hydroxyl group, an alkyl group, an acyl group, an arylalkyl group or a carbonate group or is also a carbamoyl group or a trimethyl silyl group.

In one preferred embodiment of the present invention, the adhesive compositions contain so-called mixed derivatives of α-, β- and/or γ-cyclodextrins corresponding to general formula I which contain both one of the above-mentioned alkyl, alkylene, cycloalkyl and/or alkylaryl groups as a substituent $R^2$, $R^3$ and $R^6$ and also an acyl, trialkylsilyl and/or urethane group as another substituent $R^2$, $R^3$ and $R^6$.

The adhesive compositions according to the invention preferably contain as setting accelerators mixed derivatives of α-, β- and/or γ-cyclodextrins corresponding to formula I, in which on a statistical average two of the substituents $R^2$, $R^3$ and $R^6$ represent a linear or branched alkyl or alkenyl group containing up to 12 carbon atoms and/or a cycloalkyl group and/or an alkylaryl group containing up to 12 carbon atoms and in which on a statistical average one of the substituents represents an acyl group and/or a urethane group —C(O)—NR'$_2$.

Preferred mixed derivatives of α-, β- and/or γ-cyclodextrins corresponding to general formula I are those in which, on a statistical average, one of the substituents $R^2$, $R^3$ and $R^4$ is an acyl group —C(O)R', where R' is a hydrogen atom, an alkyl, alkylene, cycloalkyl or alkylaryl group containing up to 12 carbon atoms and may bear halogens, ether, ester or alkoxy groups as substituents.

Particularly suitable mixed derivatives of cyclodextrins corresponding to general formula I are those in which, on a statistical average, the substituent $R^3$ or $R^6$ and preferably the substituent $R^3$ is an acyl group as defined above and the other substituents represent a linear alkyl group containing up to 12 carbon atoms.

Within the last group of mixed derivatives, those of α- and/or β-cyclodextrins are preferably used as setting accelerators.

The adhesive compositions according to the invention may contain a single hydroxyl group derivative of the α-, β- and/or γ-cyclodextrins or mixtures of two or more derivatives.

The adhesives according to the invention may contain other typical additives, such as anionic polymerization inhibitors and/or radical polymerization inhibitors, thickeners, plasticizers, heat stabilizers and also dyes, pigments and the like as auxiliaries, preferably in quantities of 0.001 to 30% by weight, based on the adhesive composition.

Anionic polymerization inhibitors may be added to the adhesives according to the invention in quantities of 1 to 1,000 ppm, based on the total weight of the adhesive composition, to stabilize them in storage. Examples of such inhibitors are sulfur dioxide, aromatic sulfonic acids, aliphatic sulfonic acids and phosphoric acids. Suitable radical polymerization inhibitors are, for example, hydroquinone and hydroquinone monomethyl ether which may be added in a quantity of 1 to 5,000 ppm, based on the total weight of the adhesive composition. Thickeners in the form of cellulose derivatives, polyvinyl acetates, polymethyl methacrylates, polyacrylate rubbers and methacrylate copolymers may be added to the adhesive composition according to the invention to increase its viscosity. The quantity of thickener required is dependent upon the particular application envisaged and upon the composition of the adhesive.

In addition, plasticizers, dyes, pigments etc. may be added to the adhesive according to the invention. The quantities added are again dependent upon the particular application envisaged, although there is an upper limit insofar as the stability and adhesive strength of the α-cyanoacrylate adhesives should not be adversely affected.

The present invention also relates to a process for the production of the adhesive composition according to the invention. According to the invention, commercially available α-cyanoacrylates are intensively stirred or shaken with the hydroxyl group derivatives of α-, β- and/or γ-cyclodextrins. The dissolution of the cyclodextrin derivatives can be accelerated by an increase in temperature. There is an upper limit to the temperatures insofar as secondary reactions, for example decomposition of the cyanoacrylates, should be avoided. The automatic shaking of these α-, β- and/or γ-cyclodextrin derivatives in cyanoacrylates at room temperature has proved to be a particularly suitable process. Other additives may optionally be incorporated both before and after addition of the cyclodextrin derivatives. In another embodiment of the present invention, these cyclodextrin derivatives are first dissolved in a solubilizer compatible with cyanoacrylates, for example selected from phthalates or alkyl α-cyanoacetates, before they are mixed with the cyanoacrylate monomers. It has proved to be of advantage to dissolve the hydroxyl group derivatives of the cyclodextrins in the particular α-cyanoacrylate beforehand and then to mix the stock solution thus obtained with the rest of the particular cyanoacrylate.

The adhesive compositions according to the invention based on α-cyanoacrylates are distinguished as a whole by short setting times and by high stability in storage. The rapid curing of the adhesive composition according to the invention enables it to be widely used for bonding porous materials and/or materials showing an acidic surface reaction, such as wood, paper, leather or textiles, even in problematical applications.

EXAMPLES

A Derivatization of the Cyclodextrins

Example 1

Synthesis of heptakis(2,6-di-O-n-butyl)βcyclodextrin 18 g commercial β-cyclodextrin containing approx. 10% by weight water were dissolved in 400 ml predried dimethyl sulfoxide. 45.1 ml n-bromobutane and 16 8 g finely powdered sodium hydroxide were then added to the solution, followed by stirring at room temperature. To complete the reaction, another 23 ml n-bromobutane and 8.4 g sodium hydroxide were stirred in after 24 to 48 hours. After the reaction mixture had been stirred for a total of 3 to 4 days at room temperature, the completeness of the reaction was verified by thin layer chromatography using a mixture of tert. butyl methyl ether and petroleum ether in a ratio of 30:70 as eluent. The thin-layer chromatograms were developed by immersion in a mixture of concentrated sulfuric acid and ethanol in a ratio of 2:98. The Rf value was 0.3, the Rf value of the β-cyclodextrin being 0.

The reaction mixture was worked up by liquid/liquid extraction. The reaction solution was poured into 400 ml water and extracted twice with 300 ml tert. butyl methyl ether. The combined ether phases were washed twice with 500 ml water and once with 500 ml semiconcentrated sodium chloride solution and concentrated in vacuo. The crude product thus obtained was first prepurified by column chromatography and then further purified by further column chromatography. For preliminary purification, the crude product was applied to a column (diameter 7 cm, height 45 cm), which was filled with 800 to 1,000 g silica gel (particle size 0.063 mm to 0.2 mm), under a pressure of 0.05 to 0.1 bar using a mixture of petroleum ether with tert. butyl methyl ether in a ratio of 30:70 as eluent. After approx. 500 ml first runnings, the prepurified product was obtained as second fraction. This prepurified product was in turn applied to a column (diameter 6 cm, height 60 to 70 cm) charged with 800 to 1,000 g silica gel (particle size 0.04 mm to 0.063 mm) under a pressure of 0.05 to 0.1 bar using the same eluent as in the preliminary purification step. After approx. 1,200 to 1,600 ml first runnings, the purified product was obtained as the second fraction. The second fraction was concentrated in vacuo, giving 10 to 12 g of a solid which was recrystallized from methanol.

Example 2

Preparation of heptakis(2,6-di-O-n-butyl,3-O-acetyl)β-cyclodextrin (=prod. 2)

5.8 g of the heptakis(2,6-di-O-n-butyl)β-cyclodextrin prepared in accordance with Example 1 were introduced into a two-necked flask. The flask was then evacuated, thoroughly heated and purged with nitrogen. 5.2 ml acetanhydride and 20 ml dried pyridine were added with stirring under nitrogen and heated to 80° C. To complete the reaction, another 2.6 ml acetanhydride were added after 2 days. The reaction was terminated after 4 days at the earliest. The completeness of the reaction was verified by thin-layer chromatography using a mixture of dichloromethane and tert. butyl methyl ether in a ratio of 60:40 as eluent. The Rf values were 0.3 for the product and 0.83 for the educt.

The reaction mixture was then worked up by liquid/liquid extraction. To this end, the reaction solution was poured into 100 ml water and extracted twice with 50 ml tert. butyl methyl ether. The combined ether phases were then washed twice with 100 ml water, extracted with sodium hydrogen carbonate solution (pH=8.4) and subsequently concentrated in vacuo. The crude product obtained was purified by column chromatography. To this end, 7 to 8 g of the crude product were applied to a column diameter 6 cm, height 60 to 70 cm) filled with 7 to 800 g silica gel (particle size 0.04 to 0.063 mm) under a pressure of 0.05 to 0.1 bar in the presence of a mixture of dichloromethane and tert. butyl methyl ether in a ratio of 60:40 as eluent. After approx. 1,000 ml first runnings, the product was obtained as the third fraction which was dried in vacuo and recrystallized from methanol.

Example 3

Preparation of a phenyl carbamoyl derivative of β-cyclodextrin

In a three-necked round-bottomed flask equipped with a stirrer, dropping funnel, reflux condenser and thermometer, 28.35 g -cyclodextrin were dissolved with stirring in 225 g anhydrous dimethyl formamide at a temperature of 70° to 80° C. After addition of 62.58 g phenyl isocyanate, the reaction mixture was stirred at 100° C. until reaction of the isocyanate was complete (4 hours).

The reaction mixture was cooled to room temperature and poured into 1 liter ice water. The precipitate was filtered off, washed repeatedly with water and dried in vacuo at 70° C. The crude product was recrystallized once from isopropanol. Mp.: 210° C.; N content: 7.34% by weight, corresponding to approx. 16 phenyl carbamoyl groups per β-cyclodextrin and corresponding to a degree of derivatization of approx. 76%.

Example 4

Trimethylsilyl-O-β-cyclodextrin

In a 1 liter three-necked round-bottomed flask equipped with a stirrer, reflux condenser, gas inlet pipe and thermometer, 29.2 g anhydrous β-cyclodextrin, 300 g dried dimethyl formamide and 60 g hexamethyl disilazane were heated to 90° C. while nitrogen was passed over and stirred for 4 hours at room temperature. Escaping ammonia gas was collected in a receiver containing dilute aqueous hydrochloric acid. The reaction mixture was concentrated in vacuo to dryness. The residue was recrystallized twice from acetone. Mp.: 240° to 242° C; Si content: 16.5% by weight (corresponding to approx. 1.65 trimethylsilyl groups per glucose unit and to approx. 11.6 trimethylsilyl groups per β-cyclodextrin unit and to a degree of derivatization of 55%).

B Adhesive Composition

Example 5

Different quantities of heptakis(2,6-di-O-n-butyl,3-acetyl)β-cyclodextrin prepared in accordance with Example 2 were added to commercial ethyl-2-cyanoacrylate stabilized with 20 ppm phosphoric acid, 20 ppm $SO_2$ and 100 ppm hydroquinone and dissolved by automatic shaking for 24 hours at room temperature. At higher temperatures, but not exceeding 200° C., the necessary dissolving time was considerably shorter. The setting times observed in the bonding of various test specimens are shown in Table 1 as a function of the quantity of cyclodextrin derivative added.

TABLE 1

| Materials/ test specimens | Setting time [seconds] | | | |
|---|---|---|---|---|
| | 0% | +0.05% by weight prod. 2 | +0.1% by weight prod. 2 | +0.2% by weight prod. 2 |
| SBR rubber | 2 | 2 | 1 | 1 |
| Aluminium | 25 | 20 | 20 | 20 |
| Limba wood | >120 | 30 | 20 | 10 |
| Balsa wood | 6 | 4 | 3 | 2 |
| Spruce wood | 60 | 20 | 10 | 8 |
| Beech wood | 60 | 15 | 8 | 5 |
| Offset paperboard, white (150 g/m²) | >120 | 20 | 15 | 8 |
| Linen-finish paperboad (200/m²) | 60 | 20 | 10 | 5 |
| Cover paperboard, embossed (300 g/m²) | 60 | 25 | 15 | 10 |

The setting time of all adhesive compositions, including those of the following Examples, were determined as follows for the various materials:

SBR: A round (15 mm diameter) solid rubber cord of styrene/butadiene rubber (SBR) was freshly cut. 1 to 2 drops of adhesive were applied to the surface and the ends of the rubber cord were immediately fitted together. The setting time is the time to flexing resistance.

Aluminium: The time at which two freshly cleaned and bonded aluminium sleeves (A=0.5 cm) showed a measurable resistance to shifting was determined.

Wood material: Pieces of limba, balsa, spruce and beech measuring 100×25×10 mm were bonded with a 10 mm overlap. The time to initial adhesion was the setting time.

Paperboard: The various paper types were cut into strips approx. 10 cm long and cm wide. The cardboard was then made into a loop and bonded with a 1 cm overlap, i.e. the actual bonded area was 1 cm². The time at which material was torn from the paper surface on separation of the bond was measured as the setting time.

The strength of the bonds obtained with various adhesive compositions on various types of paperboard are set out in Table 2. The strength of the bonds is determined by a method developed by applicants themselves:

Face-ground steel cubes with an edge length of 1 cm were provided on one side with a double-sided adhesive tape. The individual paperboards were applied to the adhesive tape under heavy contact pressure over a square area measuring 1 cm². The paperboard surfaces of 2 steel cubes were then bonded with 1 to 2 drops of the cyanoacrylate adhesive composition. The pair of cubes was clamped in the holder of a pendulum tester which is described in detail in ASTM Standard D950. The impact energy required from the pendulum weight per bonded area to destroy the bond is indicated. The natural strengths of the paperboards were correspondingly determined without the cyanoacrylate adhesive composition, instead the paperboards were joined by double-sided adhesive tapes and contact pressure. The natural strengths of the individual paperboards were as follows:

| | |
|---|---|
| Offset cardboard, white (150 g/m$^2$): | 7N · cm/cm$^2$ |
| Linen-finish cardboard (200 g/m$^2$): | 8N · cm/cm$^2$ |
| Cover paperboard, embossed (300 g/m$^2$): | 10N · cm/cm$^2$ |

TABLE 2

| Adhesive | Paperboard | Setting time to natural strength | Strength after curing for a certain time[1] |
|---|---|---|---|
| Without accelerator | | >180 secs. | 5N · cm/cm$^2$ |
| + 0.05% by weight prod 2 | Offset paperboard, white (150 g/m$^2$) | 80 secs. | 7N · cm/cm$^2$ |
| + 0.10% by weight prod. 2 | | 30 secs. | 10N · cm/cm$^2$ (M)[2] |
| + 0.20% by weight prod. 2 | | 20 secs. | 15N · cm/cm$^2$ (MA)[3] |
| Without accelerator | | 60 secs. | 6N · cm/cm$^2$ |
| + 0.05% by weight prod. 2 | Linen-finish paperboard (200 g/m$^2$) | 20 secs. | 12N · cm/cm$^2$ (M) |
| + 0.10% by weight prod. 2 | | 15 secs. | 12N · cm/cm$^2$ (MA) |
| + 0.20% by weight prod. 2 | | 10 secs. | 14N · cm/cm$^2$ (MA) |
| Without accelerator | | >10 mins. | 7N · cm/cm$^2$ (MA) |
| + 0.05% by weight prod. 2 | Cover paperboard, embossed (300 g/m$^2$) | 180 secs. | 15N · cm/cm$^2$ (MA) |
| + 0.10% by weight prod. 2 | | 120 secs. | 17N · cm/cm$^2$ (MA) |
| + 0.20% by weight prod. 2 | | 60 secs. | 20N · cm/cm$^2$ (MA) |

Note:
[1]Strength was determined after the following curing times:
Offset cardboard = after 30 seconds
Linen-finish paperboard = after 20 seconds
Cover paperboard = after 120 seconds
[2]M = material partly torn out
[3]MA = material completely torn out To determine stability in storage, accelerated ageing of the described adhesive composition was carried out over 5 days and 10 days at 80° C. in polyethylene bottles. It was found that, after this time which corresponds to normal storage at room temperature for at least one year, only the usual slight increase in viscosity was observed in the adhesive compositions containing setting accelerator. The results of the tests to determine stability in storage are set out in Table 3:

TABLE 3

| | Viscosity [mPa · s] | |
|---|---|---|
| | 5 days/80° C. | 10 days/80° C. |
| Without accelerator | 10 | 25 |
| + 0.05% by weight product 2 | 10 | 35 |
| + 0.10% by weight product 2 | 15 | 40 |
| + 0.20% by weight product 2 | 15 | 80 |

*Method: Brookfield LVT with U1 adapter at 20° C.

Example 6

Commercial stabilized ethyl-2-cyanoacrylate was mixed as in Example 5 with various quantities of phenyl carbamoyl derivatives of β-cyclodextrin prepared in accordance with Example 3. Table 4 shows the setting times of the various adhesive compositions for the bonding of various test specimens by comparison with a non-accelerated ethyl-2-cyanoacrylate mixture.

TABLE 4

| Materials/ test specimens | Setting time [seconds] | | | |
|---|---|---|---|---|
| | 0% | 0.05% by weight | 0.1% by weight | 0.3% by weight |
| SBR | 2 | 2 | 2 | 2 |
| Aluminium | 25 | 20 | 20 | 20 |

TABLE 4-continued

| Materials/ test specimens | Setting time [seconds] | | | |
|---|---|---|---|---|
| | 0% | 0.05% by weight | 0.1% by weight | 0.3% by weight |
| Limba | >120 | 60 | 40 | 30 |
| Balsa | 6 | 6 | 6 | 5 |
| Spruce | 60 | 50 | 30 | 15 |
| Beech | 60 | 60 | 50 | 30 |
| Offset paperboard, white (150 g/m$^2$) | >120 | >60 | >60 | <60 |
| Linen-finish paperboard (200/m$^2$) | 60 | 30 | 30 | 30 |
| Cover paperboard, embossed (300 g/m$^2$) | 60 | 60 | 60 | 60 |

Example 7

2-Ethyl cyanoacrylate adhesive mixtures were produced as described in Example 5. Various quantities by weight of acetylated β-cyclodextrin were added as accelerator. The β-cyclodextrin was acetylated by the literature method of D. French et al., J. Am. Chem. Soc. 71 (1949), pages 353–356, except that, in contrast to that method, the acetylation reaction was terminated a) after 2 hours (prod. 7a)
b) after 3 hours (prod. 7b).

Analysis of the acetylated cyclodextrins showed approx. 2.7 acetyl groups per glucose unit for reaction product 7a) and approx. 2.8 acetyl groups per glucose unit for 7b), which corresponds to a degree of derivatization of 90% for 7a) and approx. 94% for 7b). The setting times of these adhesive compositions are shown in Table 5.

TABLE 5

| Materials/ test specimens | Setting time [seconds] | | | | |
|---|---|---|---|---|---|
| | 0% | 0.1% by weight prod. 7a | 0.5% by weight prod. 7a | 0.1% by weight prod. 7b | 0.5% by weight prod. 7b |
| SBR | 2 | 2 | 2 | 2 | 2 |
| Aluminium | 25 | 20 | 20 | 20 | 20 |
| Limba | >120 | 50 | 60 | 60 | 60 |
| Balsa | 6 | 5 | 3 | 5 | 3 |
| Spruce | 60 | 25 | 30 | 20 | 25 |
| Beech | 60 | 50 | 50 | 20 | 30 |
| Offset paperboard, white (150 g/m$^2$) | >120 | >60 | >60 | <60 | <60 |
| Linen-finish paperboard (200/m$^2$) | 60 | 35 | 30 | 40 | 40 |
| Cover paperboard, embossed (300 g/m$^2$) | 60 | 30 | 30 | 40 | 40 |

Example 8

0.1% by weight hexakis(2,6-di-O-n-butyl,3-O-acetyl-)α-cyclodextrin prepared in accordance with Example 1 and Example 2 using α-cyclodextrin instead of β-cyclodextrin was dissolved in the 2-ethyl cyanoacrylates according to Example 5 by automatic shaking (1 to 3 days, room temperature).

Table 6 shows the setting times observed in the bonding of various materials while Table 7 shows the strength of the bonds obtained in dependence upon the quantity of cyclodextrin added.

Stability in storage is comparable with the adhesive compositions according to Example 5.

TABLE 6

| Materials/<br>test specimens | Setting time [seconds] | | | |
|---|---|---|---|---|
| | 0% | 0.05% by weight prod. 8 | 0.1% by weight prod. 8 | 0.2% by weight prod. 8 |
| SBR | 2 | 1 | 1 | 1 |
| Aluminium | 25 | 20 | 20 | 20 |
| Limba wood | >120 | 15 | 12 | 8 |
| Balsa wood | 6 | 2 | 2 | 2 |
| Spruce wood | 60 | 15 | 10 | 5 |
| Beech wood | 60 | 10 | 8 | 5 |
| Offset paperboard, white (150 g/m²) | >120 | 10 | 5 | 3 |
| Linen-finish paperboard (200/m²) | 60 | 8 | 5 | 3 |
| Cover paperboard, embossed (300 g/m²) | 60 | 10 | 8 | 10 |

TABLE 7

| Adhesive | Paperboard | Setting Time [secs.] | Strength* [N × cm/cm²] |
|---|---|---|---|
| No addition | | >180 | 5 |
| + 0.05% by wt. prod. 8 | Offset paper- | 15 | 12 (MA) |
| + 0.10% by wt. prod. 8 | board, white | 15 | 12 (MA) |
| + 0.20% by wt. prod. 8 | (150 g/m²) | 10 | 12 (MA) |
| No addition | | 60 | 6 |
| + 0.05% by wt. prod. 8 | Linen-finish | 5 | 11 (MA) |
| + 0.10% by wt. prod. 8 | paperboard | 5 | 12 (MA) |
| + 0.20% by wt. prod. 8 | (200 g/m²) | 2 | 13 (MA) |
| No addition | | >600 | 7 |
| + 0.05% by wt. prod. 8 | Cover paper- | 10 | 9 (MA) |
| + 0.10% by wt. prod. 8 | board, | 5 | 11 (MA) |
| + 0.20% by wt. prod. 8 | embossed (300 g/m²) | 2 | 12 (MA) |

*Note:
Strength was determined in accordance with the note beneath Table 2.

Example 9

Various quantities by weight of 9a) trimethylsilyl derivative of β-cyclodextrin prepared in accordance with Example 4 (=prod. 9a)

9b) heptakis(2,6-di-O-methyl)β-cyclodextrin, commercial product (=prod. 9b)

9c) heptakis(2,3,6-tri-O-methyl)β-cyclodextrin, commercial product (prod. 9c), 9d) heptakis(2,6-di-O-n-butyl)β-cyclodextrin prepared in accordance with Example 1 (=prod. 9d)

were added to 2-ethyl cyanoacrylates stabilized in accordance with Example 5.

The setting times of the various adhesive compositions for the bonding of various test specimens are shown in Table 8.

TABLE 8

| Materials/<br>test specimens | Setting time in seconds | | | | | |
|---|---|---|---|---|---|---|
| | 0.2% by weight prod. 9a | 0.2% by weight prod. 9b | 0.2% by weight prod. 9c | 0.5% by weight prod. 9c | 0.1% by weight prod. 9d | 0.2% by weight prod. 9d |
| SBR | 1 | 1 | 1 | 1 | 1 | 1 |
| Limba | >60 | >60 | >60 | 40–50 | >60 | 40–50 |
| Balsa | 5 | 3 | 3 | 3 | 3 | 3 |
| Beech | 60 | 15 | 30 | 20 | 20–30 | 20–30 |
| Spruce | 20 | 30 | 30 | 30 | 30 | 30 |
| Offset paper- | >60 | >60 | >60 | >60 | >60 | >60 |

TABLE 8-continued

| Materials/<br>test specimens | Setting time in seconds | | | | | |
|---|---|---|---|---|---|---|
| | 0.2% by weight prod. 9a | 0.2% by weight prod. 9b | 0.2% by weight prod. 9c | 0.5% by weight prod. 9c | 0.1% by weight prod. 9d | 0.2% by weight prod. 9d |
| board, white [150 g/m²] | | | | | | |
| Linen-finish paperboard [200 g/m²] | 40 | 20 | 15–20 | 15–20 | >60 | 30 |
| Cover paperboard, blue, embossed [300 g/m²] | >60 | 60 | 60 | >60 | >60 | >60 |
| Cover paperboard, beige | 15–20 | 30 | 15 | 10 | 25 | 20 |

We claim:

1. An adhesive composition comprising α-cyanoacrylate and a hydroxyl group derivative of α-, β-, γ-cyclodextrin which is at least partly soluble in said α-cycanoacrylate and which corresponds to the formula

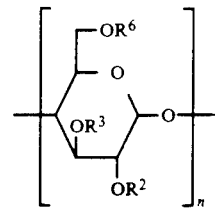

wherein $R^2$, $R^3$ and $R^6$ are the same or different and are independently selected from the group consisting of hydrogen, a linear alkyl containing up to 12 carbon atoms, a branched alkyl containing up to 12 carbon atoms, a linear alkenyl containing up to 12 carbon atoms, a branched alkenyl containing up to 12 carbon atoms, a cycloalkyl containing up to 12 carbon atoms, an alkylaryl containing up to 12 carbon atoms, an acyl group corresponding to the formula —C(O)—R', a group corresponding to the formula —C(O)—NR'$_2$ and a trialkylsilyl group corresponding to the formula —SiR"$_3$; wherein $R^2$, $R^3$ and $R^6$ are not simultaneously hydrogen; wherein n is 6, 7 or 8; wherein R' is hydrogen, linear alkyl containing up to 12 carbon atoms, branched alkyl containing up to 12 carbon atoms, linear alkenyl containing up to 12 carbon atoms, branched alkenyl containing up to 12 carbon atoms, a cycloalkyl containing up to 12 carbon atoms, an alkylaryl containing up to 12 carbon atoms or an aryl; wherein R" is an alkyl containing up to 6 carbon atoms; and wherein $R^2$, $R^3$ and $R^6$ optionally contain a substituent selected from the group consisting of a halogen, an ether, an ester and an alkoxy.

2. An adhesive composition as in claim 1 wherein on a statistical average two of $R^2$, $R^3$ and $R^6$ are selected from the group consisting of an alkyl, alkenyl, cycloalkyl and alkylaryl, each group containing up to 12 carbon atoms, and one of $R^2$, $R^3$ and $R^6$ is selected from the group consisting of an acyl group corresponding to the formula —C(O)—R' and a group corresponding to the formula —C(O)—NR'$_2$, wherein R' is hydrogen, a linear or branched alkyl containing up to 12 carbon atoms, a cycloalkyl branched alkenyl containing up to 12 carbon atoms, a cycloalkyl containing up to 12 carbon atoms, or alkylaryl containing up to 12 carbon atoms, and wherein $R^2$, $R^3$ and $R^6$ optionally contain a substituent selected from the group consisting of a halogen, ether, ester and alkoxy.

3. An adhesive composition as in claim 1 wherein on a statistical average $R^3$ or $R^6$ is an acyl group corresponding to the formula —C(O)—R' as defined previously and the other of $R^2$, $R^3$ and $R^6$ are a linear alkyl containing up to 12 carbon atoms.

4. An adhesive composition as in claim 1 wherein said hydroxyl group derivative of $\alpha$-, $\beta$- or $\gamma$- cyclodextrin is present in an amount of from about 0.001% to about 5% by weight, based on the weight of said adhesive composition.

5. An adhesive composition as in claim 1 wherein said hydroxyl group derivative of $\alpha$-, $\beta$- or $\gamma$-cyclodextrin has been reacted to a degree of derivatization, on a statistical average, of from about 25 to about 100%.

6. An adhesive composition as in claim 1 further containing an additive selected from the group consisting of a polymerization inhibitor, plasticizer, heat stabilizer, dye, and thickener.

7. An adhesive composition as in claim 1 wherein said $\alpha$-cyanoacrylate is present in an amount of from about 70 to about 99.9% by weight, based on the weight of said adhesive composition.

* * * * *